United States Patent
Cohen

(10) Patent No.: US 10,771,610 B2
(45) Date of Patent: Sep. 8, 2020

(54) PERSONAL EMERGENCY TRIGGERING, NOTIFICATION AND COMMUNICATION FOR SMARTWATCHES

(71) Applicant: Smartwatcher Technologies AG, Basel (CH)

(72) Inventor: Morgan Cohen, Basel (CH)

(73) Assignee: Smartwatcher Technologies AG, Zurich (CH)

( * ) Notice: Subject to any disclaimer, the term of this patent is extended or adjusted under 35 U.S.C. 154(b) by 0 days.

(21) Appl. No.: 16/600,085

(22) Filed: Oct. 11, 2019

(65) Prior Publication Data

US 2020/0045161 A1 Feb. 6, 2020

Related U.S. Application Data

(62) Division of application No. 15/544,502, filed as application No. PCT/IB2016/000102 on Jan. 21, 2016, now Pat. No. 10,477,008.
(Continued)

(51) Int. Cl.
*H04M 11/04* (2006.01)
*H04M 1/725* (2006.01)
(Continued)

(52) U.S. Cl.
CPC ...... *H04M 1/72541* (2013.01); *G08B 25/009* (2013.01); *G08B 25/016* (2013.01);
(Continued)

(58) Field of Classification Search
CPC .. G06Q 50/265; G08B 25/001; G08B 25/005; G08B 25/009; G08B 25/016;
(Continued)

(56) References Cited

U.S. PATENT DOCUMENTS 6,262,666 B1 * 7/2001 Lodichand .......... G08B 25/016
340/539.1
6,294,993 B1 9/2001 Calaman
(Continued)

FOREIGN PATENT DOCUMENTS

EP 2073486 6/2009
KR 20150007362 A 1/2015

OTHER PUBLICATIONS

International Search Report and Written Opinion for PCT Application PCT/IB2016/000102, dated Jul. 13, 2016, 29 pages.

*Primary Examiner* — Ronald Eisner
(74) *Attorney, Agent, or Firm* — Lowenstein Sandler LLP

(57) ABSTRACT

A wearable mobile device executes a personal safety service client application to detect activation of a periodic safety confirmation mode, wherein the activation is detected from a first user input received by the wearable mobile device, receive, from a personal safety service server, a request for safety confirmation, and detect a safety confirmation event, wherein the safety confirmation event is detected from a second user input received by the wearable mobile device. The personal safety service client application is further to provide an indication of the safety confirmation event to the personal safety service server, wherein the personal safety service server is configured to send a notification message via a push notification displayed on user devices of a predefined group of emergency contacts indicating the occurrence of an emergency if the indication of the safety confirmation event is not received within a first pre-defined time interval and periodically receive additional requests for safety confirmation, wherein each additional request for safety confirmation is received after a second pre-defined time interval has passed.

30 Claims, 11 Drawing Sheets

Related U.S. Application Data

(60) Provisional application No. 62/107,252, filed on Jan. 23, 2015.

(51) Int. Cl.
  *G08B 25/00* (2006.01)
  *G08B 25/01* (2006.01)
  *H04W 4/029* (2018.01)
  *H04W 4/90* (2018.01)
  *H04L 29/08* (2006.01)
  *H04M 3/46* (2006.01)
  *H04M 3/51* (2006.01)
  *H04M 3/533* (2006.01)
  *H04W 4/12* (2009.01)
  *G06Q 50/26* (2012.01)

(52) U.S. Cl.
  CPC .......... *H04L 67/26* (2013.01); *H04M 1/7253* (2013.01); *H04M 3/46* (2013.01); *H04M 3/5166* (2013.01); *H04M 3/53375* (2013.01); *H04W 4/029* (2018.02); *H04W 4/12* (2013.01); *H04W 4/90* (2018.02); *G06Q 50/265* (2013.01); *G08B 25/001* (2013.01); *G08B 25/005* (2013.01); *H04M 2242/04* (2013.01); *H04M 2242/30* (2013.01)

(58) Field of Classification Search
  CPC . H04L 67/26; H04M 1/7253; H04M 1/72541; H04M 2242/04; H04M 2242/30; H04M 3/46; H04M 3/5166; H04M 3/53375; H04W 4/029; H04W 4/12; H04W 4/90
  USPC ............ 455/404.1, 404.2, 456.1–457; 340/539.13, 988–996; D10/104.2
  See application file for complete search history.

(56) References Cited

U.S. PATENT DOCUMENTS

| | | | |
|---|---|---|---|
| 6,342,834 B1 | 1/2002 | Berube et al. | |
| 6,496,111 B1 | 12/2002 | Hosack | |
| 6,624,754 B1 | 9/2003 | Hoffman et al. | |
| 6,678,514 B2 | 1/2004 | Wheeler et al. | |
| 6,686,840 B1 | 2/2004 | Hammond et al. | |
| 6,853,302 B2 | 2/2005 | Monroe | |
| 7,026,928 B1 | 4/2006 | Lane | |
| 7,038,590 B2 | 5/2006 | Hoffman et al. | |
| 7,047,203 B2 | 5/2006 | Johnson | |
| 7,076,235 B2 | 7/2006 | Esque et al. | |
| 7,088,252 B2 | 8/2006 | Weekes | |
| 7,212,111 B2 | 5/2007 | Tupler et al. | |
| 7,221,928 B2 | 5/2007 | Laird et al. | |
| 7,248,170 B2 | 7/2007 | DeOme et al. | |
| 7,308,246 B2 | 12/2007 | Yamazaki et al. | |
| 7,400,249 B2 | 7/2008 | Monroe | |
| 7,433,672 B2 | 10/2008 | Wood | |
| 7,495,562 B2 | 2/2009 | Monroe | |
| 8,031,074 B2 | 10/2011 | Lizza | |
| 8,041,017 B2 | 10/2011 | Goldman et al. | |
| 8,107,920 B2 | 1/2012 | Ben Ayed | |
| 8,149,124 B2 | 4/2012 | Hoffman et al. | |
| 8,179,255 B1 | 5/2012 | Lamore et al. | |
| 8,295,445 B2 | 10/2012 | Nguyen et al. | |
| 8,380,162 B2 | 2/2013 | Matsuo et al. | |
| 8,396,447 B2 | 3/2013 | Reich et al. | |
| 8,441,352 B2 | 5/2013 | Sizemore | |
| 8,461,983 B2 | 6/2013 | McCauley | |
| 8,466,795 B2 | 6/2013 | Hoffman et al. | |
| 8,693,977 B2 | 4/2014 | Patnaik et al. | |
| 8,862,092 B2 | 10/2014 | Reitnour | |
| 2010/0296634 A1 | 11/2010 | Schulzrinne et al. | |
| 2011/0319051 A1 | 12/2011 | Reitnour | |
| 2012/0087482 A1 | 4/2012 | Alexander | |
| 2013/0346521 A1* | 12/2013 | Arabo | H04L 29/08693 709/206 |
| 2014/0247124 A1 | 9/2014 | Ros | |
| 2014/0315513 A1 | 10/2014 | Long | |
| 2014/0365390 A1 | 12/2014 | Braun | |
| 2015/0031348 A1* | 1/2015 | Lee | G06F 3/0482 455/418 |
| 2015/0065082 A1 | 3/2015 | Sehgal | |
| 2015/0279199 A1 | 10/2015 | Yarkoni | |

\* cited by examiner

PERSONAL EMERGENCY TRIGGERING, NOTIFICATION AND COMMUNICATION FOR SMARTWATCHES

RELATED APPLICATIONS

This application is a divisional of U.S. application Ser. No. 15/544,502, filed Jul. 18, 2017, which is a 371 application of PCT/IB2016/000102, filed Jan. 21, 2016, which claims the benefit of U.S. Provisional Application No. 62/107,252, filed Jan. 23, 2015, all of which are hereby incorporated by reference herein.

TECHNICAL FIELD

This disclosure relates to the field of personal safety services, and in particular to personal emergency triggering, notification and communication for smartwatches.

BACKGROUND

Personal safety is an important issue, especially as the world seems to be becoming a more dangerous place. As crime statistics increase, a large and growing population of users is seeking personal safety services that provide an ever-present, discreet way of notifying others about the occurrence of an emergency. These users further seek a personal safety solution that is affordable, effective and convenient enough for widespread use.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
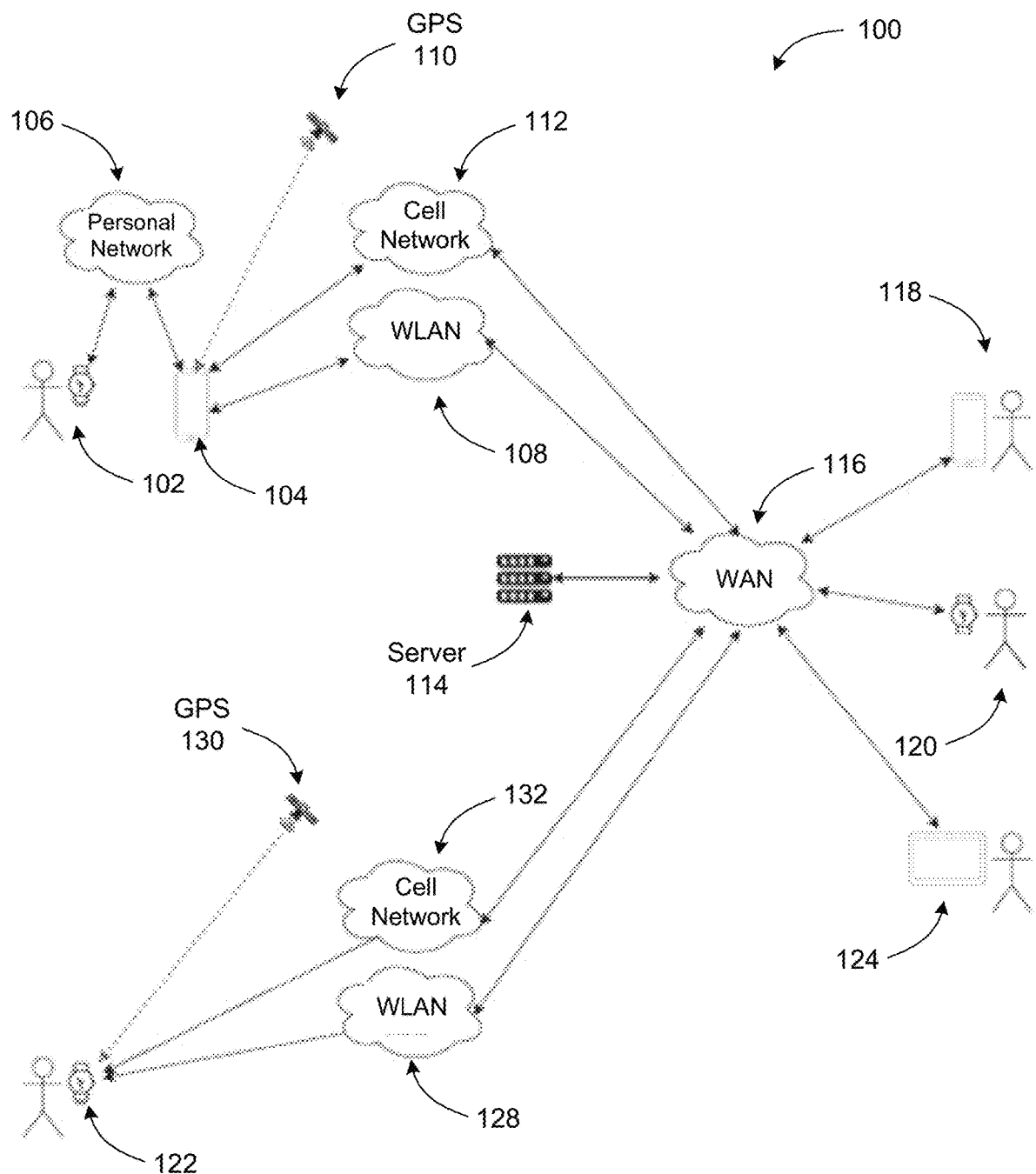
FIG. 1 is a block diagram illustrating a network environment in which embodiments of the present invention may operate.

Embodiments are described for triggering, notification and communication of emergencies in a personal safety service. In one embodiment, a mobile application implemented on a smartwatch or other wearable mobile device provides a mechanism for a user of the service to trigger an emergency event in a discreet manner. A pre-defined group of contacts may be notified about the emergency event on their own mobile device through the use of push notifications, and can track the user's location on a map and receive other information about the emergency. Members of the group of emergency contacts can be automatically apprised of relevant information about the emergency, and can communicate with each other via instant messages, thereby facilitating coordination. In one embodiment, the user maintains a social network of emergency contacts that is based on a one-way model. For example, a user may invite one or more other individuals to become his emergency contacts. Those individuals who accept the invitation to be the user's emergency contacts, however, need not invite the user to be their own emergency contact.

In the event of an emergency, such as an assault, a robbery, kidnapping, a medical event, a fire, etc., it may be beneficial to contact the authorities or other individuals to notify them of the occurrence of the emergency. Dialing the official emergency telephone number (e.g., 911 in the USA, or 112 internationally) may have a number of drawbacks in the event of an emergency. First, it is often not feasible to place an emergency call during an emergency situation. For example, during an attack or robbery, the attacker will obviously not permit the victim to place a call. Alternatively, those involved in an accident (e.g., a fall) or suffering from a health incident (e.g., a heart attack) may not be capable of reaching for their phone and dialing a number. Some people are so shaken merely by witnessing a distressing situation that they can't think clearly, or hold their fingers steady enough to place a call. During a fire, intense heat and smoke can make even finding the phone impossible, let alone placing a call. Second, it is sometimes not feasible to communicate during an emergency call. Even if the emergency services are successfully contacted, having a conversation can be difficult or impossible in a noisy environment (e.g., if people in the area are screaming and shouting) or if the caller does not speak the local language (e.g., when traveling). Third, friends and family members of the user experiencing the emergency are not informed as a result of the call. Some types of emergencies (e.g., an elderly person falling, teenage bullying) are better dealt with by an individual's closest friends and family members. Even in life-or-death scenarios which should be handled by professional emergency services, it is usually desirable for friends and family to be kept informed. It is often challenging and time-consuming for emergency services personnel to obtain the contact details of a victim's family members. Fourth, location information may not be sufficiently specific. In the United States as well as in many other countries, there is technology in place enabling the emergency services to be informed automatically of a caller's location. If the call is placed from a mobile phone, however, the location may be only estimation, and may not be sufficiently accurate for effective emergency support. Fifth, the official emergency number is not always reliable in certain areas. For example, in some second and third world countries, only a fraction of calls to the official emergency services are actually answered.

Consequently, some people are enlisting the use of personal safety services. Currently, there are three broad classes of these services: those based on (i) smartphone apps, (ii) Personal Emergency Response Systems (PERS), (iii) dedicated emergency watches. Each of these classes of services suffers from drawbacks which are addressed below. The personal safety service described herein, however, provides an ever-present, discreet way of notifying others about the occurrence of an emergency and offers personal safety solution that is affordable, effective and convenient enough for widespread use.

FIG. 1 is a block diagram illustrating a network environment 100 in which embodiments of the present invention may operate. Network environment 100 shows two main architectural approaches for implementing the personal safety service. The personal safety service may include any type of service or network that allows a user to notify others of an actual or possible emergency, request assistance, or signify that there may be a threat to their safety. In one embodiment, a wearable mobile device 102 (e.g., a smartwatch) is connected to another mobile device 104, such as cell phone, smart phone, hand-held computer, tablet computer, etc., via a personal area wireless data network 106 (e.g., near field communication link, Bluetooth®). The mobile device 104 may have wide area network connectivity through networks 108, 112 and 116 and location services (e.g., provided by GPS satellite 110), which are made available to wearable mobile device 102 through personal area wireless data network 106. Networks 108, 112 and 116 can include a local area network (LAN), a wireless network, a telephone network, a mobile communications network, a wide area network (WAN), such as the Internet, or a similar communication system. Wearable mobile device 102 may be any device, such as an electronic wristwatch for example, that is capable of communicating via the Internet or other data network, and whose behavior can be customized through software development. Through a combination of one or more of networks 108, 112 and 116, wearable mobile device 102 and mobile device 104 can communicate with personal safety service server 114, which in turn can communicate with the user devices of a predefined group of emergency contacts 118, 120 and 124. In another embodiment, a hybrid architecture (not illustrated) may be used, where WAN connectivity may be provided by wearable mobile device 102 directly, but location services are provided by the tethered mobile device 104, or vice versa.

In another embodiment, wearable mobile device 122 (e.g., a smartwatch) has wide area network connectivity through networks 128, 132 and 116 and location services (e.g., provided by GPS satellite 130), which are directly available via internal communications transceivers to wearable mobile device 122. Through a combination of one or more of networks 128, 132 and 116, wearable mobile device 122 can communicate with personal safety service server 114, which in turn can communicate with the user devices of a predefined group of emergency contacts 118, 120 and 124. In other embodiments, the location services provided to wearable mobile device 122 (and/or mobile device 104) utilize the global positioning system (GPS), assisted GPS (A-GPS), cellular network base station locations, crowd-sourced Wi-Fi network locations, or some other system. In one embodiment, if wearable mobile device 102 loses its connection to mobile device 104, wearable mobile device may switch its connectivity and functional similar to wearable mobile device 122. Thus, rather than communicating with personal safety service server 114 through mobile device 104, wearable mobile device 102 may be configured to communicate directly through networks 108, 112 and/or 116.

In one embodiment, a personal safety service client application running on wearable mobile device 122, mobile device 104 or wearable mobile device 102 provides a mechanism for a user of the personal safety service to trigger an emergency event in a discreet manner. The pre-defined group of emergency contacts 118, 120 and 124 may be notified about the emergency event on their own mobile device through the use of push notifications, and can track the user's location on a map and receive other information about the emergency. Push notifications let an application notify a user of new messages or events, even when the user is not actively using the application. When a user device receives a push notification from an application server, such as personal safety service server 114, typically the application's icon and a message appear either as a banner at the top of the screen, a modal window or as an alert which the user may select or dismiss. When the user selects the notification, the application may be launched on the relevant screen. Members of the group of emergency contacts can be automatically apprised of relevant information about the emergency, and can communicate with each other via instant messages, thereby facilitating coordination. In one embodiment, the user maintains a social network of emergency contacts 118, 120 and 124 that is based on a one-way model. For example, a user may invite one or more other individuals to become his emergency contacts. Those individuals who accept the invitation to be the user's emergency contacts, however, need not invite the user to be their own emergency contact. Additional details of the personal safety service implemented using smartwatches or other wearable mobile devices are provided below.

Figure 2:
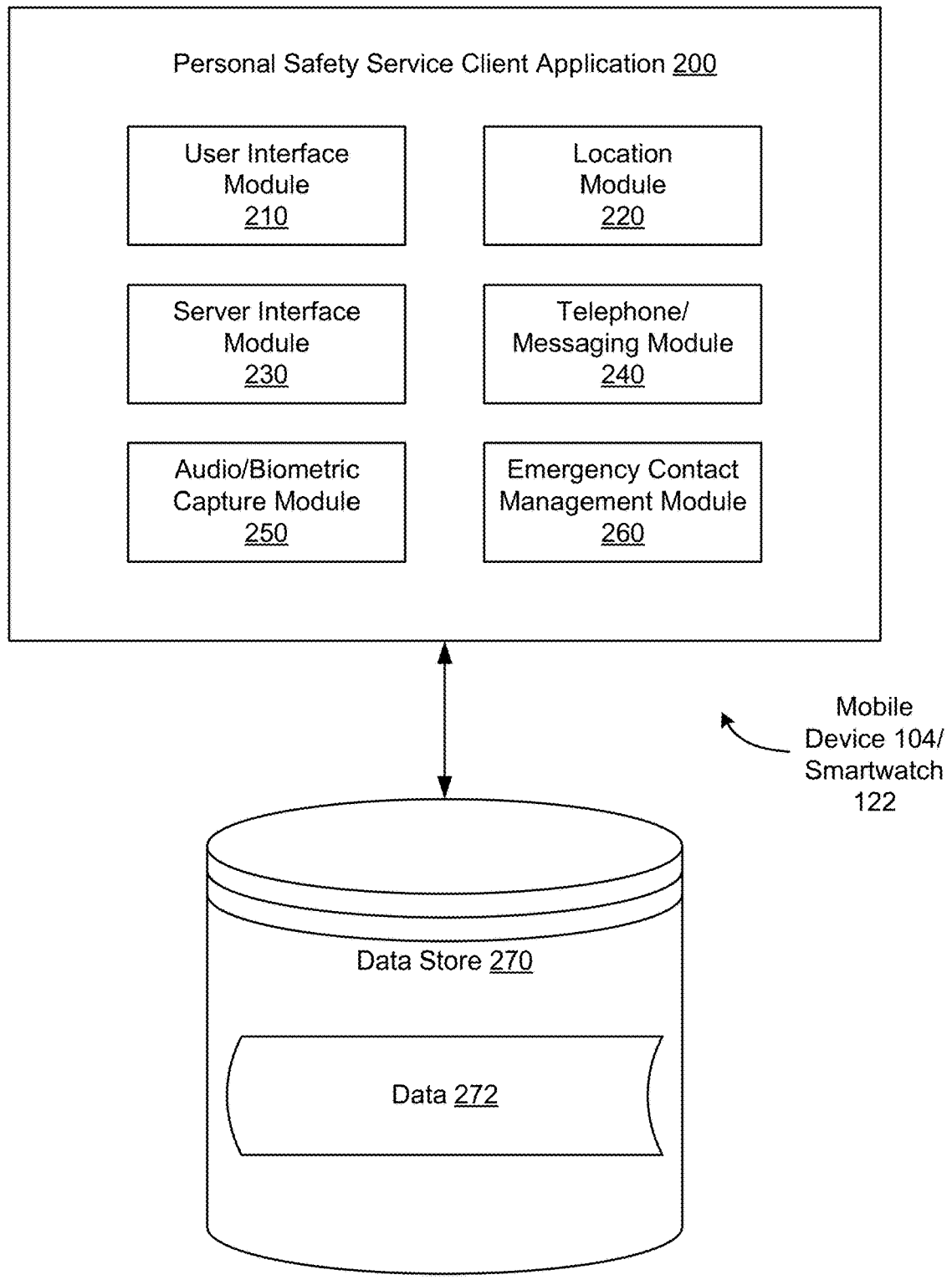
FIG. 2 is a block diagram illustrating a personal safety service client application, according to an embodiment.

FIG. 2 is a block diagram illustrating personal safety service client application 200 that is executed on at least one of wearable mobile device 102, mobile device 104 or wearable mobile device 122, according to an embodiment. In one embodiment, personal safety service client application 200 includes user interface module 210, location module 220, server interface module 230, telephone/messaging module 240, audio/biometric capture module 250 and emergency contact management module 260. This arrangement of modules and components may be a logical separation, and in other embodiments, these modules or other components can be combined together or separated in further components, according to a particular embodiment. In one embodiment, data store 270 is connected to personal safety service client application 200 and includes various data 272. In one embodiment, personal safety service client application 200 may be part of an operating system running on wearable mobile device 102, mobile device 104 or wearable mobile device 122. In another embodiment, personal safety service client application 200 may be a standalone application. In one embodiment, wearable mobile device 102, mobile device 104 or wearable mobile device 122 may include both personal safety service client application 200 and data store 270. In another embodiment, data store 270 may be external to wearable mobile device 102, mobile device 104 or wearable mobile device 122 and may be connected over a network or other connection. In other embodiments, personal safety service client application 200 may include different and/or additional components which are not shown to simplify the description. Data store 270 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium. Additional details of personal safety client application 200 are provided below.

Figure 3:
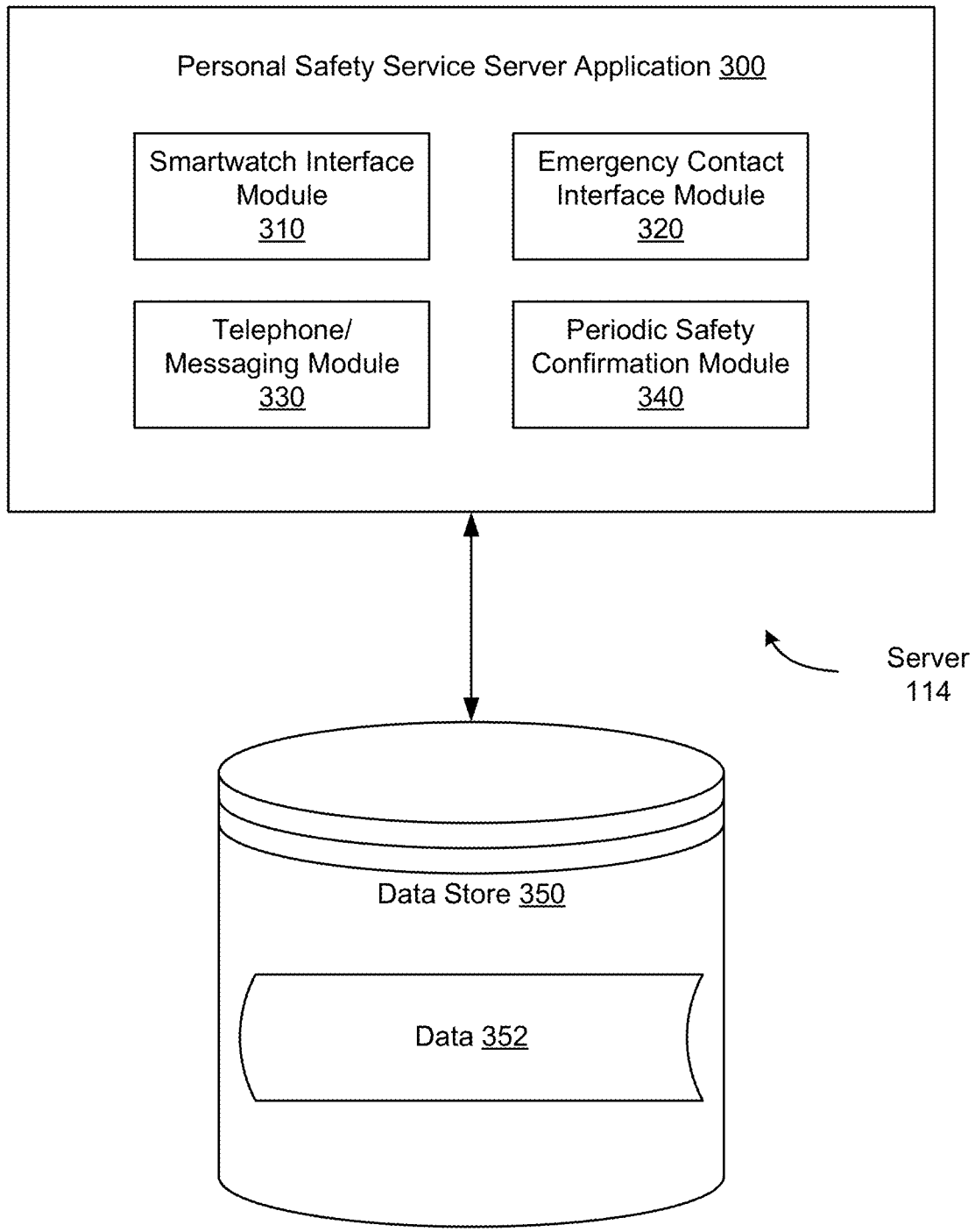
FIG. 3 is a block diagram illustrating a personal safety service server application, according to an embodiment.

FIG. 3 is a block diagram illustrating personal safety service server application 300 that is executed on server 114, according to an embodiment. In one embodiment, personal safety service server application 300 includes smartwatch interface module 310, emergency contact interface module 320, telephone/messaging module 330 and periodic safety confirmation module 340. This arrangement of modules and components may be a logical separation, and in other embodiments, these modules or other components can be combined together or separated in further components, according to a particular embodiment. In one embodiment, data store 350 is connected to personal safety service server application 300 and includes various data 352. In one embodiment, personal safety service server application 300 may be part of an operating system running on server 114. In another embodiment, personal safety service server application 300 may be a standalone application. In one embodiment, server 114 may include both personal safety service server application 300 and data store 350. In another embodiment, data store 350 may be external to server 114 and may be connected over a network or other connection. In other embodiments, personal safety service server application 300 may include different and/or additional components which are not shown to simplify the description. Data store 350 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium. Additional details of personal safety server application 300 are provided below.

Figure 4:
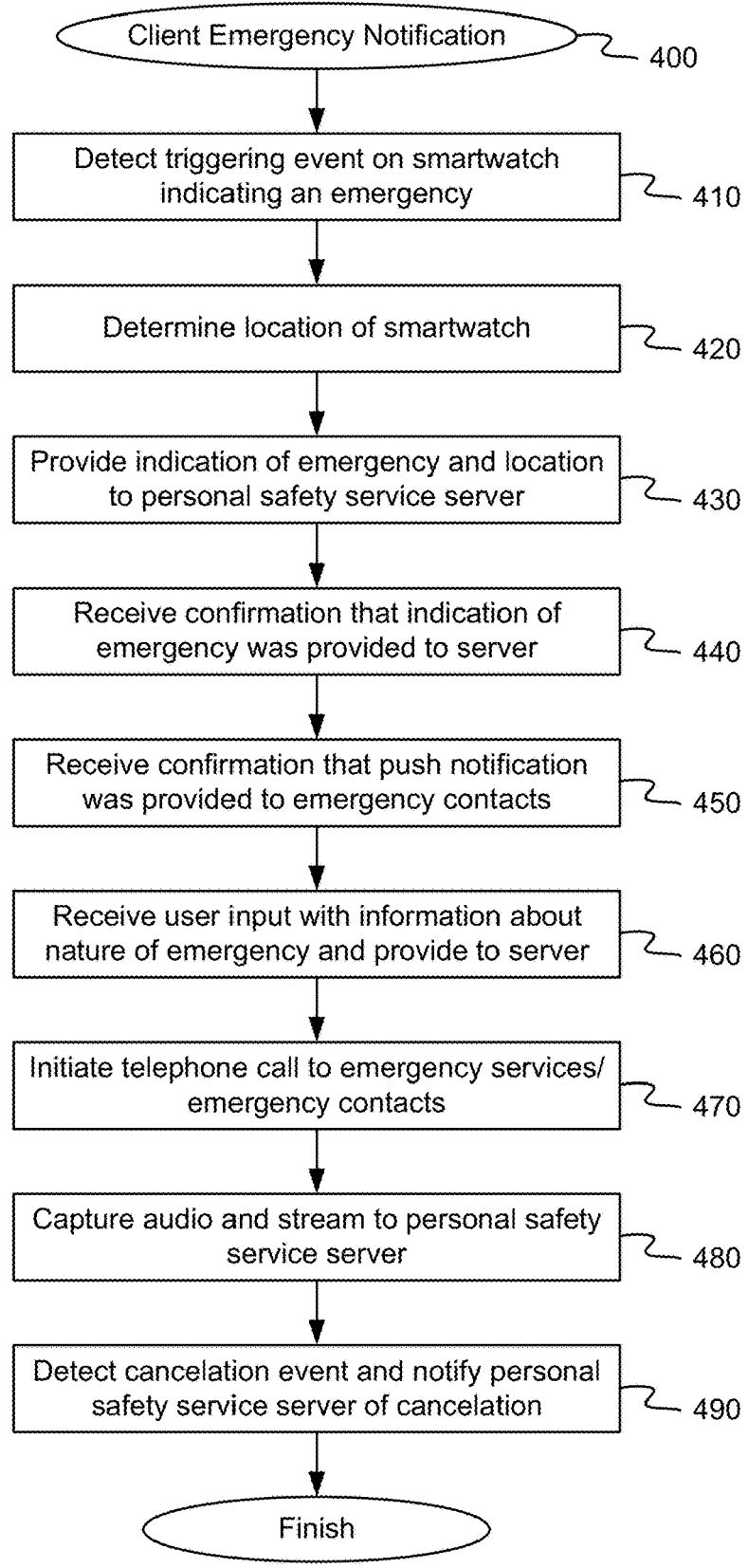
FIG. 4 is a flow diagram illustrating a client-side emergency notification method, according to an embodiment.

FIG. 4 is a flow diagram illustrating a client-side emergency notification method, according to an embodiment. The method 400 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to detect the occurrence of an emergency and notify a predefined group of emergency contacts about the occurrence of the emergency. In one embodiment, method 400 may be performed by personal safety service client application 200, as shown in FIG. 2.

Figure 9A:
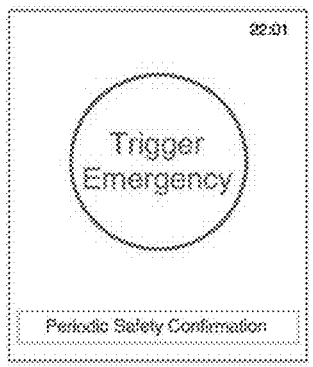
FIGS. 9A-9K are screenshots illustrating personal safety service user interfaces presented on a wearable mobile device.

Referring to FIG. 4, at block 410, method 400 detects a triggering event indicating an emergency. In one embodiment, user interface module 210 detects the triggering event from user input received by wearable mobile device 102 or 122. The user input received by user interface module 210 may include, for example, pressing one or more physical buttons on the wearable mobile device, turning or pressing a crown of the smartwatch, shaking the wearable mobile device to activate an accelerometer, making a selection on a touchscreen of the wearable mobile device, speaking a predetermined phrase, or some other form of user input. In one embodiment, a user can trigger an emergency in a discreet manner, for example by depressing one of the smartwatch's buttons for 3 seconds (known as a "long press") or 3 times in quick succession. This can be advantageous in certain types of emergencies (e.g. kidnapping, where assailants may escalate their attack if they are aware that a user is calling for help). FIG. 9A illustrates a user interface presented on a smartwatch showing a touchscreen button which can be pressed to generate a triggering event. The ability to indicate the occurrence of an emergency from a smartwatch or other wearable mobile device provides a number of advantages. Since normally a user always wears their smartwatch, the ability to call for help is generally always present. In addition, a smartwatch is a general purpose device, capable of running various applications for a variety of purposes. Thus, the user is not restricted to wearing a device which is dedicated purely to the purpose of emergency notification. Further, since the triggering of emergencies can be implemented as a purely software solution on general purpose smartwatches, it is relatively inexpensive for an individual to acquire this functionality.

At block 420, method 400 determines a location of the wearable mobile device 102 or 122, or mobile device 104. In one embodiment, location module 220 determines the location, using the location services provided by the operating system of a tethered smartphone 104. Alternatively the location services are provided by the operating system of the smartwatch 122 itself. The location services accessible by location module 220 may include the global positioning system (GPS), assisted GPS (A-GPS), cellular network base station locations, crowd-sourced Wi-Fi network locations, or some other system. In one embodiment, location module 220 interprets the location of the wearable mobile device 102 or 122, or mobile device 104 as the location of the corresponding emergency.

At block 430, method 400 provides an indication of the emergency and the location of the emergency to personal safety service server 114. In one embodiment, server interface module 230 transmits the information to server 114 via a combination of one or more of networks 106, 108, 112, 116, 128 and 132, depending on the implementation. Server interface module 230 may transmit the information to server 114 automatically in response to the detection of a triggering event at block 410. In one embodiment, location module 220 and server interface module 230 may periodically provide updates for the location of wearable mobile device 102, 122 or mobile device 104 to personal safety service server 114. For example, the location may be updated after a period of time has passed (e.g., every 10 seconds, 1 minute, 5 minutes, etc.), or the location may be updated each time the location changes. In one embodiment, server 114 is configured to send a notification message via a push notification displayed on the user devices of a predefined group of emergency contacts indicating the occurrence of the emergency associated with the user. Additional details of the operation of personal safety service server 114 are provided below with respect to FIG. 5.

Figure 9B:

At block 440, method 400 receives a confirmation that the triggering event was detected and that the indication of the emergency was provided to personal safety server 114. At block 450, method 400 receives a confirmation that the notification messages sent via a push notification was displayed on the user device of at least one of the predefined group of emergency contacts, as shown in FIG. 9B. In one embodiment, user interface module 210 provides the confirmation(s) to the user, such as by causing a vibration of the wearable mobile device 102 or 122, thereby reassuring the user that the emergency event has been registered. This is beneficial in the case of low battery power of the smartwatch or smartphone, or a weak network signal, when the user will be anxious to know that their call for help has been received.

Figure 9C:
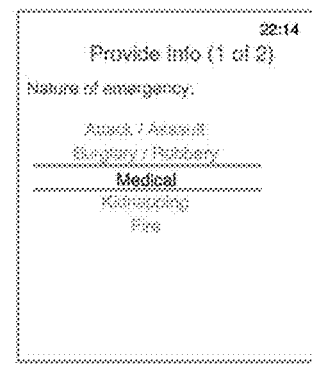
Figure 9D:
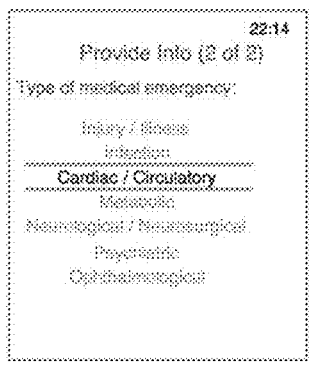

At block 460, method 400 receives user input comprising information about the nature of the emergency. During an emergency, it may be desirable to enable streamlined communication between the user who triggered the emergency and their emergency contacts, as well as amongst the emergency contacts themselves in order to co-ordinate their handling of the emergency. In one embodiment, user interface module 210 provides a user interface on a display of wearable mobile device 102 or 122 including a list of possible emergencies, as shown in FIGS. 9C and 9D. For example, the list may include Attack/Assault, Burglary/Robbery, Fire, Kidnapping, Medical, etc. The user input may include a selection of a description of the emergency from the displayed list. Server interface module 230 may transmit the information to server 114 via a combination of one or more of networks 106, 108, 112, 116, 128 and 132, depending on the implementation. Based on the user's selection, user interface module 230 may present a second list which provides more detailed information. For example, if the user selected 'Medical' for nature of emergency, they may be presented with a list of the various types of medical emergency (e.g., Injury/Illness, Infection, etc.) and make an appropriate selection. This information is presented to the emergency contacts, allowing them to react accordingly in their handling of the emergency. This is an advantage with respect to the prior art services, which do not provide an ability for a user to rapidly provide structured information about the nature of the emergency.

Figure 9E:
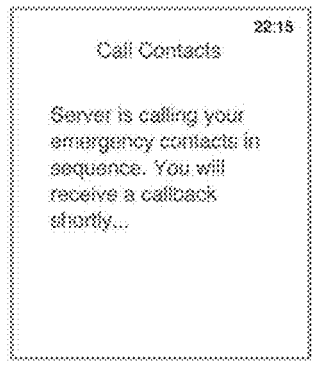
Figure 9F:
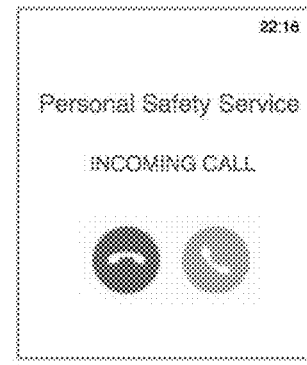
Figure 9G:
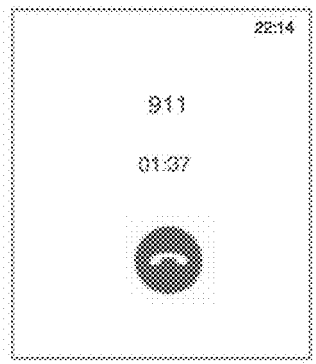

At block 470, method 400 initiates a telephone call to official emergency services or to the predefined group of emergency contacts. A user may decide to do this based on a number of factors, such as the level of response from the user's emergency contacts, the type of the emergency, the severity of the emergency, an escalation in the emergency, an opportunity arising to be able to have a conversation, etc. In one embodiment, user interface module 210 receives a request from the user to initiate the call, and telephone/messaging module 240 places the call. The call may be placed from the tethered mobile device 104 (e.g., a smartphone) or from the wearable mobile device 102 or 122 itself, if capable. This may be possible, even if an Internet connection is not available, by placing the call via the cellular phone network. The user can converse with the emergency services via the smartwatch's built-in speaker and microphone (if available) or a connected headset. In one embodiment, the emergency contacts are apprised that the user placed a call to the emergency services. This provides a potentially life-saving advantage with respect to prior art services, which do not provide a convenient way to initiate a call to the emergency services from a user's smartwatch. In one embodiment, server 114 utilizes a third-party telephony service, to place a call to each of the pre-registered emergency contacts in sequence. The first emergency contact who answers will be played a message asking them to hold, while they are connected with the emergency user. After the call is requested, but before the call is connected, a notification may be presented to the user, as shown in FIG. 9E. The telephony service may be capable of detecting if a called party is a live person and not a voicemail service. The telephony service can then place a call to the emergency user, and connect them to the emergency contact, as shown in FIGS. 9F and 9G.

At block 480, method 400 captures audio via a microphone on wearable mobile device 102, 122 and streams the captured audio to personal safety service server 114. Personal safety service server 114 may be configured to make the captured audio available to the predefined group of emergency contacts. In one embodiment, the user who triggered the emergency can enable audio streaming from wearable mobile device 102, 122. Audio captured from the microphone (or tethered smartphone in case the smartwatch does not have this capability) is transmitted to the server 114, where it may be recorded. Emergency contacts have the ability to listen to the audio either live, or at a later time. This feature can be used either as a continuous audio feed, or switched on temporarily by the user, to effectively broadcast an audio message to their emergency contacts. The form factor of a smartwatch may not be suited to text entry, however recording such an audio snippet via its built-in microphone is an option for providing freeform information, especially in an emergency situation. Similarly, the user can activate video (with or without audio) streaming from their smartwatch. In this case video is captured from a camera on the smartwatch, or from a connected wearable camera, and transmitted to the server, where it is recorded. Emergency contacts have the ability to watch the video either live, or at a later time. This can provide a rich source of information to the emergency contacts, who can pass on the information to emergency services if required. It also acts as a valuable source of evidence, which can function as a deterrent if an assailant becomes aware that they are being recorded and the recording is stored remotely.

Figure 9H:
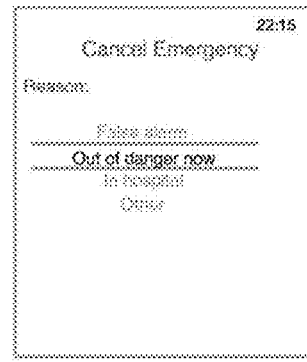
Figure 9I:
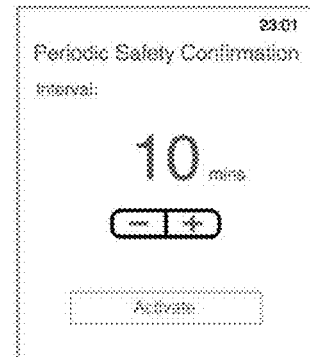
Figure 9J:
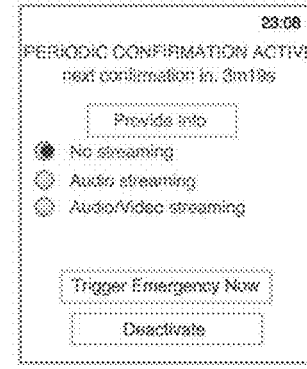

At block 490, method 400 detects a cancelation event indicating that the emergency has ended. User interface module 210 may receive user input indicating the cancelation event, as shown in FIG. 9H. Server interface module 230 may provide an indication that the emergency has ended to personal safety service server 114, which may in turn notify the predefined group of emergency contacts that the emergency has ended.

In one embodiment, the method 400 may not perform steps 410 through 490 sequentially as shown in FIG. 4. For example, the method 400 may not perform the operations of certain blocks. In addition, method 400 may also perform the operations of certain blocks in a different order, or may perform two or more of the operations in parallel rather than sequentially.

Figure 5:
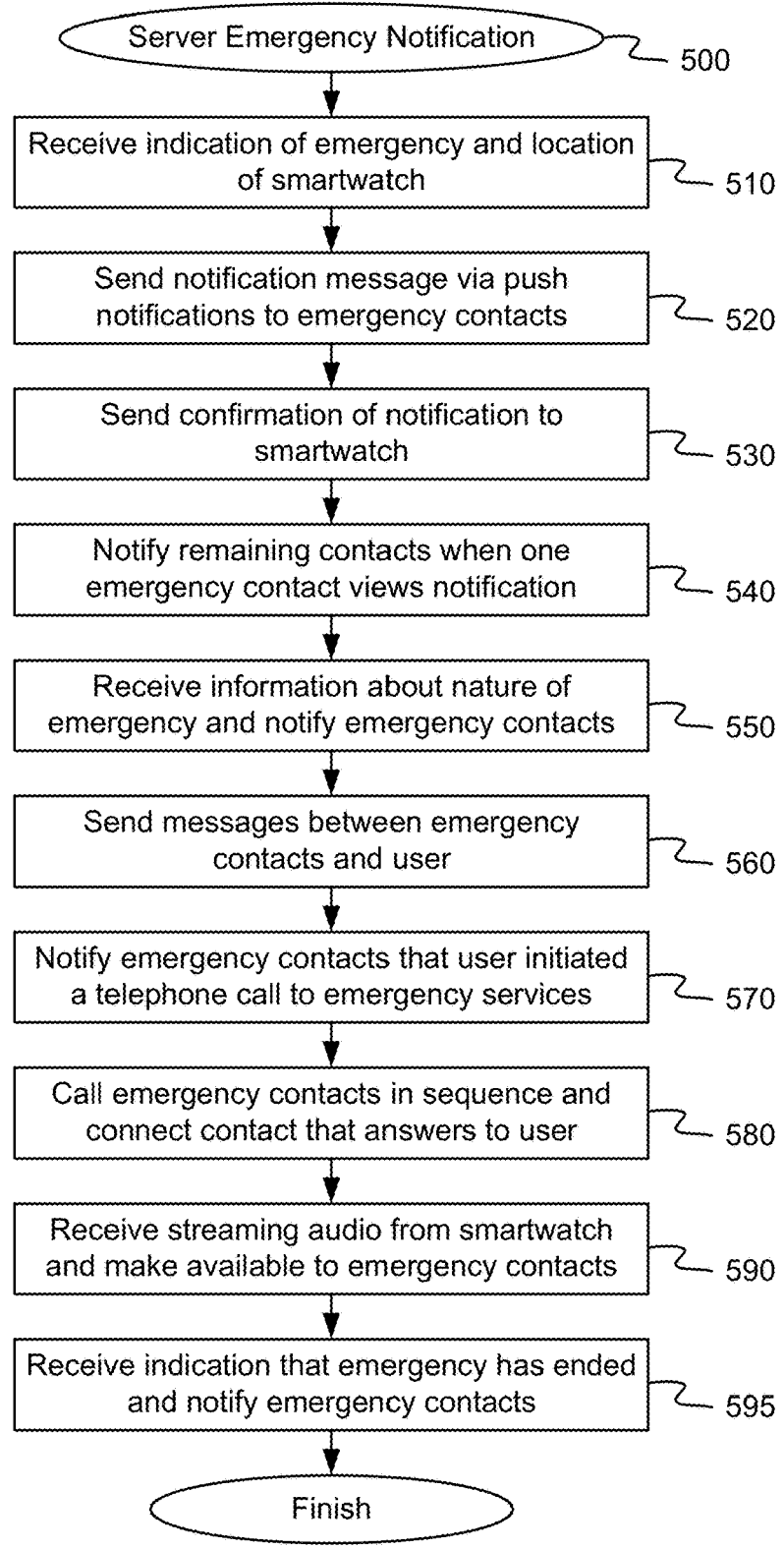
FIG. 5 is a flow diagram illustrating a server-side emergency notification method, according to an embodiment.

FIG. 5 is a flow diagram illustrating a server-side emergency notification method, according to an embodiment. The method 500 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to detect the occurrence of an emergency and notify a predefined group of emergency contacts about the occurrence of the emergency. In one embodiment, method 500 may be performed by personal safety service server application 300, as shown in FIG. 3.

Referring to FIG. 5, at block 510, method 500 receives an indication of an emergency and a location of the emergency. In one embodiment, smartwatch interface module 310 receives the indication and location from one of wearable mobile device 102, 122 or mobile device 104.

Figure 8A:
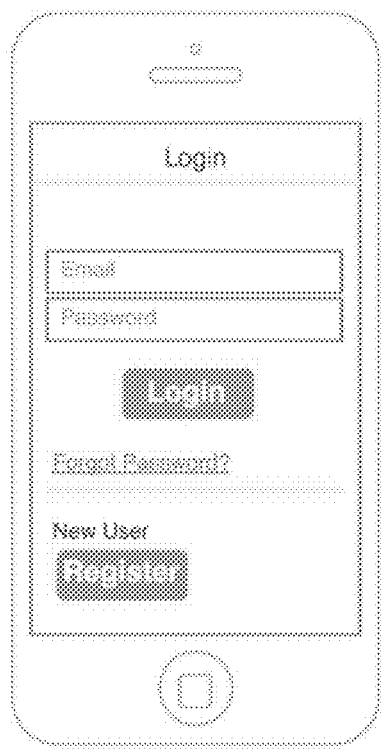
FIGS. 8A-8K are screenshots illustrating personal safety service user interfaces presented on a mobile device.
Figure 8B:
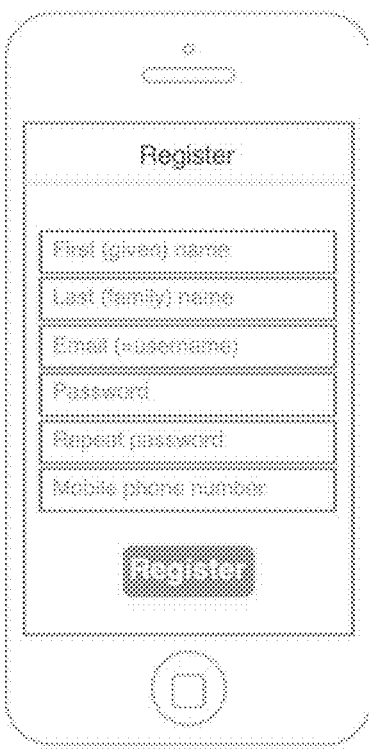
Figure 8C:

At block 520, method 500 sends a notification message via a push notification displayed on user devices of a predefined group of emergency contacts indicating the occurrence of the emergency associated with the user. In one embodiment, emergency contact interface module 320 sends a push notification to all of the user's pre-registered emergency contacts, informing them that the user has triggered an emergency (e.g. "John Doe (john@doe.com) has triggered an emergency"). FIG. 8H illustrates one example of the displayed push notification. The use of push notifications for the transmission of messages, in tandem with requiring that the emergency contacts be registered users, provide important advantages with respect to the prior art. These include economic advantages, as there is no cost incurred for sending or receiving push notifications. This is in contrast to SMS messages (also known as "text messages"), the preferred messaging channel of prior art services, which have the disadvantage of carrying an inherent per message cost levied by the mobile phone network. Prior art services must pass this cost on to their customers. As a result, it can be economically feasible to offer free membership and use of the personal safety service described herein. In another embodiment, a user acting as an emergency contact for others is free of charge (i.e. does not require a subscription) but defining one's own emergency contacts or being able to trigger an emergency requires the user to have a subscription. Another advantage is ubiquity. Invited emergency contacts must download the personal safety application if they do not already have it on their mobile device. This is in contrast to prior art services, where it is possible and indeed typical for an individual to act as an emergency contact without using an application, since notifications are provided via SMS, e-mail or by telephone call. By requiring emergency contacts to themselves be users, a "network effect" is created, since emergency contacts are likely to invite their own emergency contacts, and so on. Upon receiving a push notification, an emergency contact will see the application icon and name, and can therefore give priority to notifications relating to the personal safety service. They are therefore less likely to ignore it if they are busy, for example in a meeting. By tapping on (or otherwise selecting) the notification, the relevant application will be opened. This is in contrast to prior art services using SMS or e-mail, which are not application specific and do not have these features. After a user selects a push notification and opens the corresponding application, it can irrefutably be established that they have viewed the notification. The present invention takes advantage of this capability to provide confirmation to a user who has triggered an emergency that an emergency contact is aware of the emergency, providing the user with valuable reassurance. In one embodiment, the smartwatch vibrates, and its display indicates how many emergency contacts have viewed the emergency event. The emergency contacts receive the push notification on their mobile device (such as smartphone, tablet, or smartwatch) and can view the user's location on a map. During the emergency event, location updates are periodically (for example every minute) received by the server from the user's smartphone (or smartwatch). Thus emergency contacts have the ability to track the user's location on a map, since they can view their current and past location, as shown in FIG. 8K. In one embodiment, wearable mobile device 102, 122 or mobile device 104 buffers the location data (along with timestamps) when an Internet connection or wide area network connection is not available for the wearable mobile device, and then delivers the buffered information to the server once the connection becomes available again. This fault-tolerance is an advantage compared to prior art services, which either lose the data or encounter an error if the Internet connection is temporarily unavailable.

At block 530, method 500 sends a confirmation that the notification message sent via a push notification was displayed on the user device of at least one member of the predefined group of emergency contacts to wearable mobile device 102, 122. Smartwatch interface module 310 may transmit the information to wearable mobile device 102, 122 or mobile device 104 via a combination of one or more of networks 106, 108, 112, 116, 128 and 132, depending on the implementation.

Some smartwatches have a sensor capable of detecting if the smartwatch is removed from the wearer. For smartwatches with this capability, a notification may be sent to personal safety service server application 300, and emergency contact interface module 320 informs the emergency contacts, in one embodiment, via a push notification. The removal of the smartwatch may also be recorded in the emergency log. This lets the emergency contacts know that an escalation has likely occurred. Furthermore, it is unlikely that communication with the user can continue. Some smartwatches are equipped with sensors to monitor biological or medical aspects of the wearer—their heart rate, oxygen saturation level and arm movement. For smartwatches with this capability, audio/biometric capture module 250 may capture the biometrics and a notification may be sent to personal safety server application. Emergency contact interface module 320 informs the emergency contacts of the sensor measurements, allowing them to judge whether the user is alive and healthy. A heart-rate falling to an abnormally low level would suggest a medical problem, or exceeding a normal level would suggest a fight-or-flight response.

At block 540, method 500 notifies remaining members of the predefined group of emergency contacts when one of the predefined group of emergency contacts views the notification message indicating the occurrence of the emergency. In one embodiment, emergency contacts can view a log of all pertinent information concerning the emergency. For example, when one of the emergency contacts views the notification message informing them of the emergency, a log entry is created, thereby allowing the other emergency contacts to be apprised that their "colleague" has viewed it, and is therefore aware of the emergency. This provides a key advantage in the handling of an emergency, with respect to prior art services in which emergency contacts operate "in a vacuum" (i.e., without knowledge of what the other emergency contacts have done, have been notified of, etc.).

At block 550, method 500 receives information about the nature of the emergency and sends a notification to the predefined group of emergency contacts with the information. In one embodiment, smartwatch interface module 310 receives the information about the nature of the emergency from wearable mobile device 102 or 122 and emergency contact interface module 320 sends a push notification, SMS message, email or other communication to the mobile devices of the predefined group of emergency contacts with the information. FIG. 8J illustrates a user interface showing the information presented to the emergency contacts.

At block 560, method 500 sends messages between members of the predefined group of emergency contacts and/or between members of the predefined group of emergency contacts and the user who triggered the emergency. In one embodiment, telephone/messaging module 330 provides the ability to broadcast a textual instant message to the other emergency contacts of the user who triggered the emergency. For example, the message may be "Spoke to police, they are on their way". In one embodiment, telephone/messaging module 330 or emergency contact interface module 320 sends the message as a push notification. The message also may also appear in an emergency log. This form of communication thereby facilitates co-ordination amongst a user's emergency contacts. It should be noted that the emergency contacts may not otherwise know each other, since they are merely members of the network of a user who triggered an emergency. When there is no active emergency, the service provides no way for these emergency contacts to communicate with each other. During an emergency, an emergency contact can also send an information message to the user who triggered the emergency. For example "Police are on their way". Alternatively, an emergency contact can indicate that the message contains a question, and that the user should be prompted to respond Yes/No. For example "Are the assailants armed with automatic weapons?" These messages, along with any response from the user, are recorded in the emergency log, where they can be viewed by all emergency contacts.

At block 570, method 500 notifies the predefined group of emergency contacts that the user has initiated a telephone call to emergency services. In one embodiment, the user may place a call to emergency services using telephone/messaging module 240 of personal safety service client application 200. Once connected, a notification is sent to personal safety service server application 300 and emergency contact interface module 320 can provide a notification to the emergency contacts via push notification informing them that the user has successfully contacted emergency services.

At block 580, method 500 initiates a telephone call to members of the predefined group of emergency contacts in sequence. In one embodiment, server 114 utilizes a third-party telephony service, to place a call to each of the pre-registered emergency contacts in sequence. The first emergency contact who answers will be played a message asking them to hold, while they are connected with the emergency user. The telephony service may be capable of detecting if a called party is a live person and not a voicemail service. The telephony service can then place a call to the emergency user, and connects them to the emergency contact.

At block 590, method 500 receives streaming audio from the wearable mobile device 102, 122 and makes the captured audio available to the predefined group of emergency contacts. Audio captured by the wearable mobile device 102, 122 is received by smartwatch interface module 310 of server 114, where it may be recorded. Emergency contacts have the ability to listen to the audio either live, or at a later time. This feature can be used either as a continuous audio feed, or switched on temporarily by the user, to effectively broadcast an audio message to their emergency contacts. The form factor of a smartwatch may not be suited to text entry, however recording such an audio snippet via its built-in microphone is an option for providing freeform information, especially in an emergency situation.

At block 595, method 500 receives an indication that the emergency has ended and notifies the emergency contacts that the emergency has ended. In one embodiment, smartwatch interface module 310 may receive a notification indicating a cancelation event. Emergency contact interface module 320 may in turn notify (e.g., by push notification) the predefined group of emergency contacts that the emergency has ended.

In one embodiment, the method 500 may not perform steps 510 through 595 sequentially as shown in FIG. 5. For example, the method 500 may not perform the operations of certain blocks. In addition, method 500 may also perform the operations of certain blocks in a different order, or may perform two or more of the operations in parallel rather than sequentially.

Figure 6:
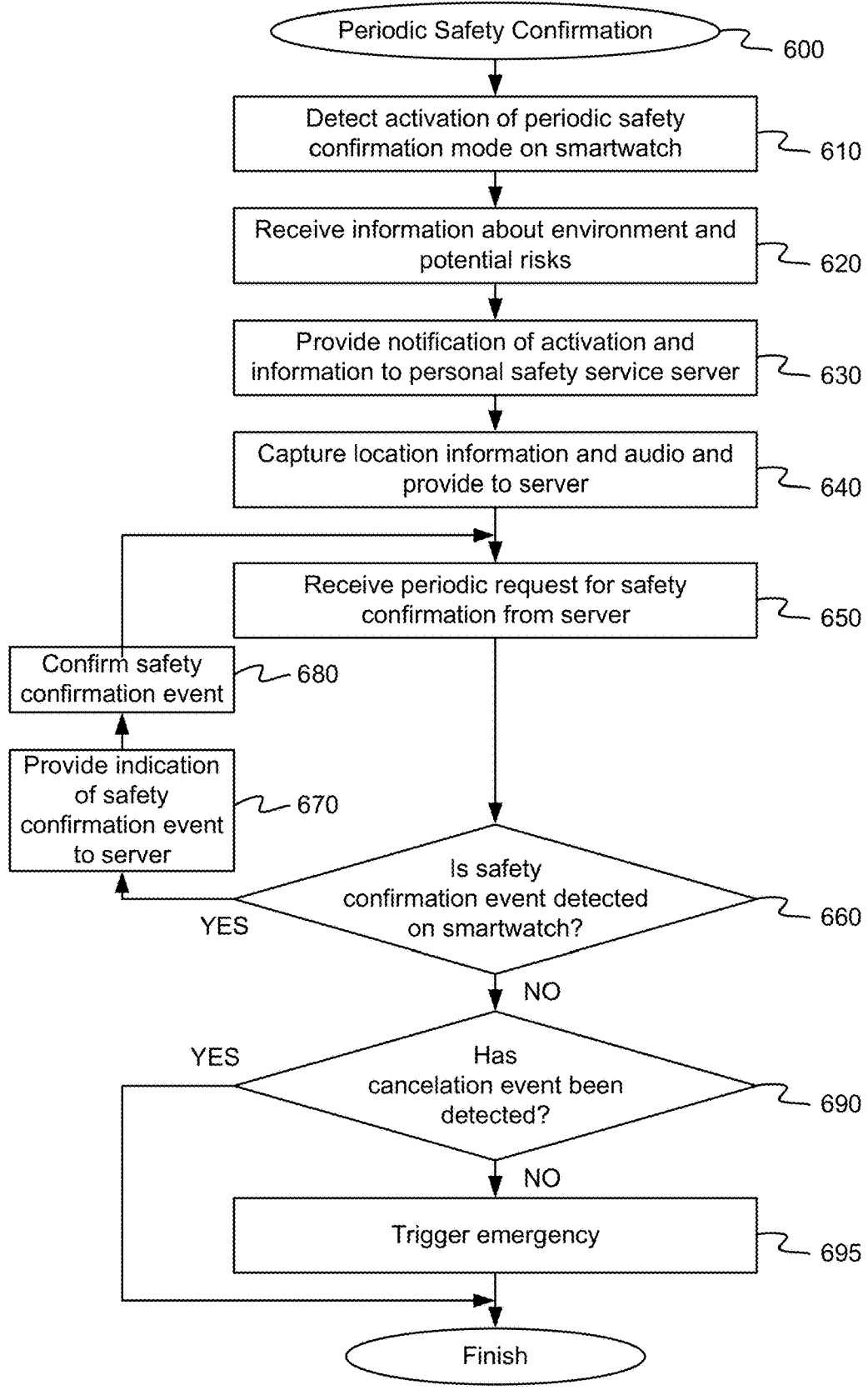
FIG. 6 is a flow diagram illustrating a periodic safety confirmation method, according to an embodiment.

FIG. 6 is a flow diagram illustrating a periodic safety confirmation method, according to an embodiment. The method 600 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to periodically monitor a potential emergency situation, detect the occurrence of an emergency and notify a predefined group of emergency contacts about the occurrence of the emergency. In one embodiment, method 600 may be performed by personal safety service client application 200, as shown in FIG. 2.

Referring to FIG. 6, at block 610, method 600 detects activation of a periodic confirmation mode. In one embodiment, user interface module 210 detects the activation from user input received by wearable mobile device 102 or 122. The user input received by user interface module 210 may include, for example, pressing one or more physical buttons on the wearable mobile device, turning or pressing a crown of the smartwatch, shaking the wearable mobile device to activate an accelerometer, making a selection on a touchscreen of the wearable mobile device, speaking a predetermined phrase, or some other form of user input. If a user believes they are entering a potentially risky environment, for example a bad neighborhood, or meeting someone for the first time, they can activate periodic safety confirmation mode. Location tracking of the user will now take place and be stored on the server.

At block 620, method 600 receives information about at least one of an environment and potential risks. In one embodiment, user input module 210 receives user input from the user about their environment or potential risks when a relevant item is selected from a list displayed on wearable mobile device 102, 122. For example, the items may include: walking to car, bad neighborhood, taxi ride, meeting stranger, etc. In another embodiment, the user has the ability to activate audio streaming, or video/audio streaming, even before an emergency event is triggered. As previously described, this can be used either for continuous streaming, to gather evidence and act as a deterrent, or when temporarily activated, can be used as an effective means of inputting information via a smartwatch, whose form factor is not optimal for text-based input.

At block 630, method 600 provides a notification that the periodic safety confirmation mode was activated and that the information about the environment and potential risks was provided to the personal safety service server 114. In one embodiment, user interface module 210 provides the notification to the user, such as by causing a vibration of the wearable mobile device 102 or 122, thereby reassuring the user that the mode has been activated. This is beneficial in the case of low battery power of the smartwatch or smartphone, or a weak network signal, when the user will be anxious to know that their request has been received.

At block 640, method 600 captures a location of the wearable mobile device 102 or 122, or mobile device 104. In one embodiment, location module 220 determines the location, using the location services provided by the operating system of a tethered smartphone 104. Alternatively the location services are provided by the operating system of the smartwatch 122 itself. The location services accessible by location module 220 may include the global positioning system (GPS), assisted GPS (A-GPS), cellular network base station locations, crowd-sourced Wi-Fi network location, or some other system. In one embodiment, server interface module 230 transmits the information to server 114 via a combination of one or more of networks 106, 108, 112, 116, 128 and 132, depending on the implementation. Server interface module 230 may transmit the information to server 114 automatically in response to the detection of a triggering event at block 410. In one embodiment, location module 220 and server interface module 230 may periodically provide updates for the location of wearable mobile device 102, 122 to personal safety service server 114. In one embodiment, audio/biometric capture module 250 captures audio from a microphone (or tethered smartphone in case the smartwatch does not have this capability) and transmits to the server 114, where it may be recorded. In one embodiment, emergency contacts have the ability to listen to the recorded audio only if an emergency is triggered at block 695.

At block 650, method 600 receives a periodic request for safety confirmation from personal safety service server 114.

After a pre-defined interval (e.g., every 5 minutes, 10 minutes, 15 minutes) periodic safety confirmation module 340 of personal safety service server application 300 sends a request for safety confirmation.

Figure 9K:
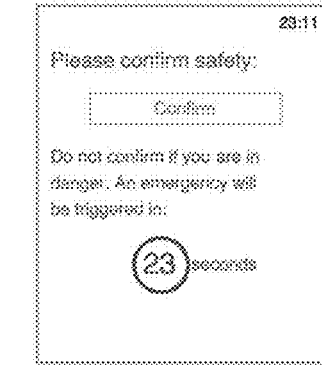

At block 660, method 600 determines whether a safety confirmation event has been detected from user input received from wearable mobile device 102, 122. In one embodiment, user interface module 210 or personal safety service client application 200 prompts the user via a vibration on their smartwatch to confirm that they are OK. The prompt may also be displayed as a user interface on the smartwatch, as shown in FIG. 9K. The user confirms their safety, in one embodiment by pressing a button on the smartwatch. Should they fail to provide confirmation within a timeout period (e.g., 30 seconds), an emergency event will be triggered and the pre-defined emergency contacts will be notified, as described above. The emergency contacts will be able to track the user's location on a map, just as for a manually triggered emergency.

If a safety confirmation event is detected, at block 670, method 600 provides an indication of the safety confirmation event to the personal safety service server 114. In one embodiment, server interface module 230 transmits the indication to server 114 via a combination of one or more of networks 106, 108, 112, 116, 128 and 132, depending on the implementation. Server interface module 230 may transmit the information to server 114 automatically in response to the detection of a safety confirmation event at block 660.

At block 680, method 600 provides a confirmation that the safety confirmation event was detected and that the indication of the safety confirmation event was provided to the personal safety service server 114. In one embodiment, user interface module 210 provides the confirmation to the user, such as by causing a vibration of the wearable mobile device 102 or 122, thereby reassuring the user that the confirmation event has been detected. In case the user's smartwatch loses network connectivity when they are supposed to provide confirmation, this fact will be detected by the server (since it also can't communicate with the user's smartphone) and notified to the pre-defined emergency contacts, so they can take into account that it may be a false alarm. Once the user regains network connectivity, they will be notified that an emergency has been raised. They can then proceed to cancel the active emergency, indicating the cancellation reason: "was unable to confirm safety".

If a safety confirmation event is detected, at block 690, method 600 determines whether a cancelation event has been detected. User interface module 210 may receive user input indicating the cancelation event. Server interface module 230 may provide an indication that the emergency has ended to personal safety service server 114.

If a safety confirmation event is detected, but a cancelation event is not detected, at block 695, method 600 triggers an emergency. In one embodiment server interface module 230 sends an indication of the occurrence of the emergency to personal safety service server application 300, where emergency contact interface module 320 notifies the emergency contacts, as described above. In one embodiment, the pre-defined emergency contacts are notified that the user has activated periodic safety confirmation, as well as the confirmation interval. This is like a yellow alert—it is effectively advising them that the user is in a potentially risky situation (but there is no actual emergency). In this embodiment, the pre-defined emergency contacts are also notified when the user deactivates periodic safety confirmation. In summary, periodic safety confirmation guarantees a user that emergency notifications will be sent within a specified time interval, even if the user is not able to trigger an emergency. This is advantageous if the user is entering a potentially risky or dangerous situation, or simply does not want to risk not being able to trigger an emergency in case there is no Internet connection or insufficient battery power.

In one embodiment, the method 600 may not perform steps 610 through 695 sequentially as shown in FIG. 6. For example, the method 600 may not perform the operations of certain blocks. In addition, method 600 may also perform the operations of certain blocks in a different order, or may perform two or more of the operations in parallel rather than sequentially.

Figure 7:
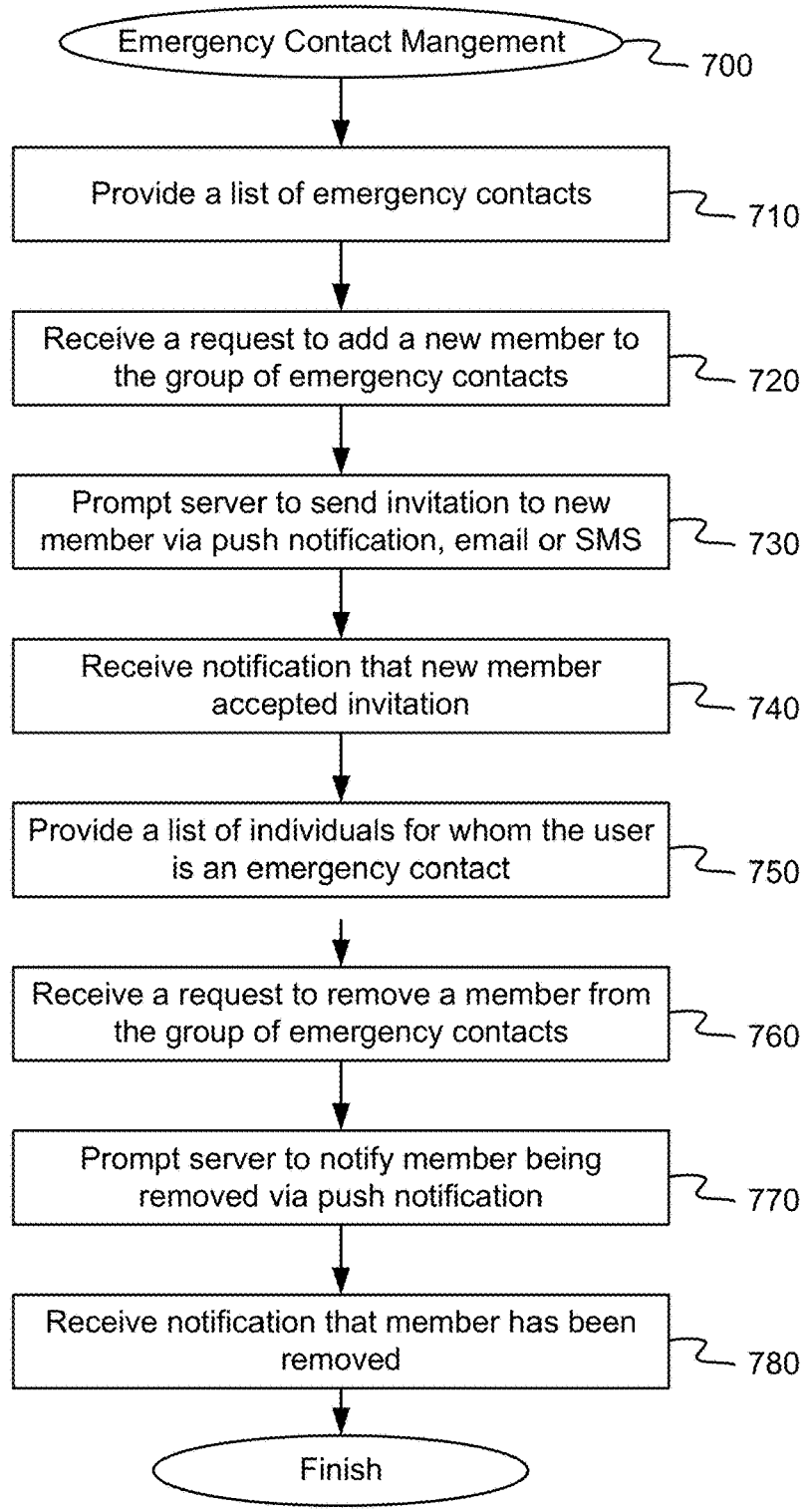
FIG. 7 is a flow diagram illustrating an emergency contact management method, according to an embodiment.

FIG. 7 is a flow diagram illustrating an emergency contact management method, according to an embodiment. The method 700 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to manage a predefined group of emergency contacts. In one embodiment, method 700 may be performed by personal safety service client application 200, as shown in FIG. 2.

Figure 8D:
Figure 8E:
Figure 8F:
Figure 8G:
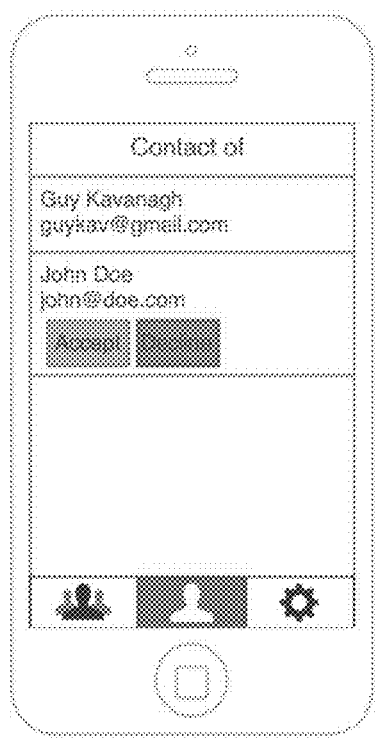
Figure 8H:
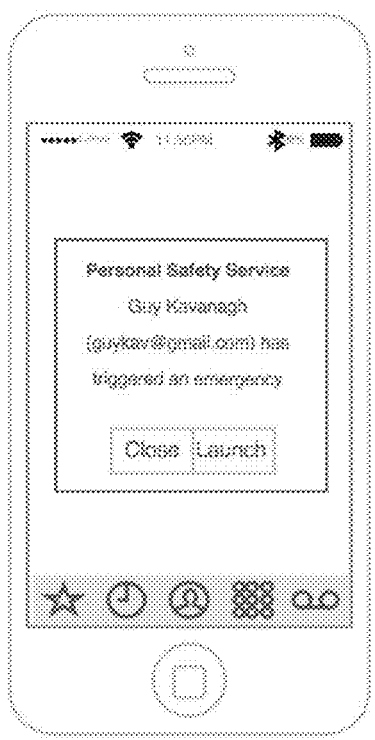
Figure 8I:
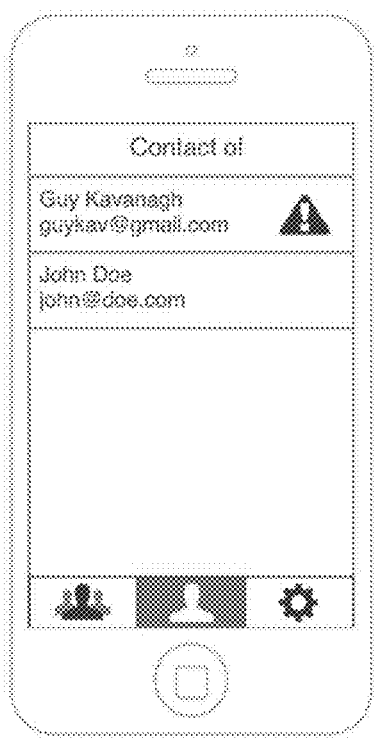
Figure 8J:
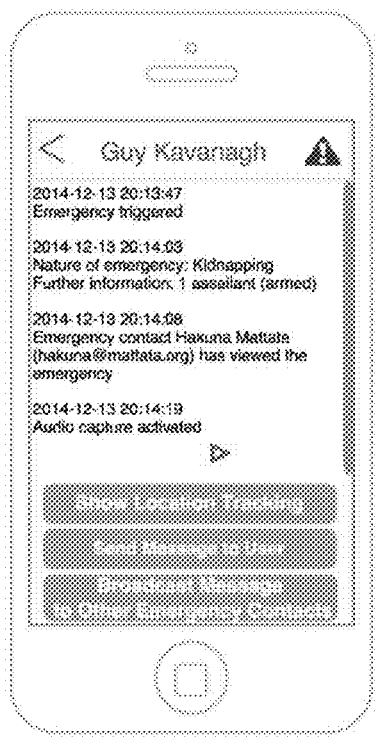
Figure 8K:
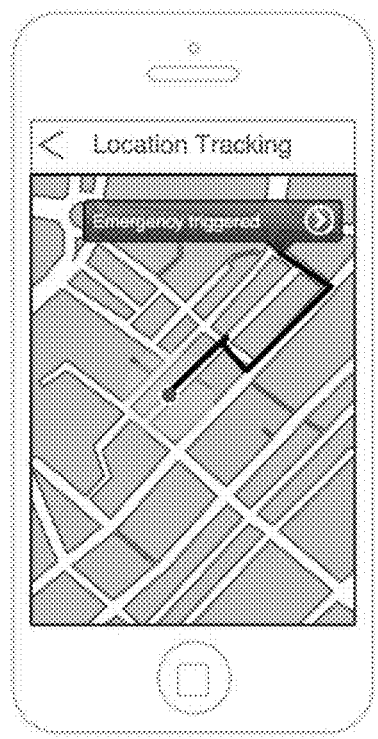

Referring to FIG. 7, at block 710, method 700 provides a list of members in the predefined group of emergency contacts, as shown in FIG. 8D. At block 720, method 700 receives a request to add a new member to the predefined group of emergency contacts. In one embodiment, user interface module 210 may receive the request through user input, as shown in FIG. 8E. At block 730, method 700 prompts personal safety service server application 300 to send an invitation to the user device of the new member inviting the new member to become an emergency contact of the user. In one embodiment, emergency contact management module 260 prompts application 300 to send the invitation via a push notification displayed on the user device of the new member. If the new member is not already a member of the personal safety service (i.e., does not have an instance of personal safety service client application installed on their device), the invitation may be transmitted via email or similar public messaging service such as SMS, and may include a prompt to register for the personal safety service and install the client application. FIGS. 8A-8C illustrate a user interface which may be displayed when a user has installed the client application and is registering for the personal safety service. FIG. 8F illustrates a user interface showing that the request has been sent and that a response is pending. FIG. 8G illustrates a user interface showing the notification sent to the new member, which allows the new member to either accept or decline the request to become an emergency contact. At block 740, method 700 receives a notification indicating that the new member accepted the invitation to become an emergency contact for the user. At block 750, method 700 provides a list of individuals for whom a user of the wearable mobile device 102, 122 is an emergency contact. This is illustrated in FIG. 8I, including an indication of any individuals who have triggered an emergency. Depending on the embodiment, the list of members in the predefined group of emergency contacts and the list of individuals for whom the user is an emergency contact may or may not include at least one difference. At block 760, method 700 receives a request to remove a member from the predefined group of emergency contacts. At block 770, method 700 prompts personal safety service server application 300 to send a notification to the user device of the member being removed to notify the member that they are being removed. In one embodiment, emergency contact management module 260 prompts application 300 to send the notification via a push notification displayed on the user device of the member being removed. At block 780, method 700 receives a notification indicating that the member has been removed.

In one embodiment, the method 700 may not perform steps 710 through 780 sequentially as shown in FIG. 7. For example, the method 700 may not perform the operations of certain blocks. In addition, method 700 may also perform the operations of certain blocks in a different order, or may perform two or more of the operations in parallel rather than sequentially.

Emergency contact management module 260 enables an individual to maintain a social network of emergency contacts. A user can display their list of emergency contacts ("My contacts"), add new ones, and display a list of others for whom the user has agreed to act as an emergency contact ("Contact of"). Prior art services either don't allow users to keep track of this—so they are likely to forget for whom they are supposed to be an emergency contact for; or they enforce a two-way relationship, meaning that if user A adds user B as an emergency contact, user A will also become an emergency contact of user B—even though user B may not want this. For example if user A is an elderly or infirm parent, it would not make sense for them to be alerted if user B, their healthy younger child, triggers an emergency). To add an emergency contact, a user is prompted to select a contact from a list of possible contacts. Upon selecting the desired contact, the user is sent an invitation inviting them to become an emergency contact of the user. An invited contact only becomes active when they confirm acceptance. This is a key advantage to prior art services, which don't require acceptance, meaning that the requester has no way of knowing if an emergency contact can be relied upon. Furthermore, ubiquity of the service is promoted, thanks to social networking of emergency contacts, and the use of push notifications. In other words, a user invites a number of emergency contacts, who in turn download the app, register for the service and invite a number of emergency contacts, and so on. Prior art services on the other hand focus on emergency contacts being informed via e-mail and SMS/text message, and allow emergency contacts to function in this role without the requirement of being registered members, or users of a mobile app.

The personal safety system described herein has many advantages over conventional systems, including smartphone apps, Personal Emergency Response Systems (PERS), and dedicated emergency watches, each of which have significant drawbacks.

Smartphone apps are software applications ("apps"), sometimes known as "panic button" or S.O.S. apps, which take advantage of the location service (based primarily on GPS technology) and Internet connectivity included in modern mobile phones ("smartphones"). If an individual feels unsafe, for example walking alone or in unfamiliar surroundings, they start the app on their smartphone. Their phone is then "armed"—and an emergency can be triggered typically either by pressing a large button displayed on the phone's touchscreen (a "soft button"), or shaking the phone to activate its accelerometer. This will cause any emergency contacts (which were previously registered during the app's setup process) to be notified, typically by text message or e-mail, giving them the ability to track the user on a map. Some apps additionally place a call to 911 (or 112). Some also generate an alarm tone using the phone's loudspeaker, with the aim of deterring a would-be attacker. In a minority of services, upon "arming" the app, a photo, or video and audio, of the individual's surroundings is captured and broadcast to a server. In most services, this is just done upon triggering an emergency. The emergency contacts are then able to review this captured media.

These services suffer from a number of essential drawbacks. First, an emergency can arise not just when one anticipates it, but at any time. Since many people normally keep their phone in a pocket or in a bag, in practice it takes too long to retrieve the phone, enter an unlock code (if active), start an app, and trigger an emergency. In fact simply dialing 911 (or 112) would often be quicker, since most phones have a built-in emergency call mode which allows the placing of such a call without entering an unlock code. Second, if an individual feels unsafe, and has therefore taken out their phone and started the app, this very action may attract attention, and consequently the individual becomes more vulnerable and attracting mischief. Third, a smart attacker could quickly grab the user's phone and smash it, before they had a chance to trigger an emergency.

One series of smartphones attempts to address these drawbacks by including a "safety assistance" feature within its operating system. When triggered, SMS and MMS messages are sent to a user's pre-defined emergency contacts. The messages contain a link to the user's current location on a map, and optionally a picture automatically taken with the phone's camera and a short audio recording. The user triggers the safety assistance by pressing the power key 3 times in quick succession. A connected compatible smartwatch can also be used for triggering in a similar fashion. However, unlike a true personal safety service which benefits from a central application server, this feature relies on just the individual smartphone and therefore suffers from a number of critical deficiencies. They lack location tracking. The link to a map shows just the user's location at the time of triggering. Therefore if the emergency is taking place on the move (in a vehicle for example) the emergency contacts will not discover the user's whereabouts. There is no ability to stream audio or video. The initial camera shot and short audio snippet captured when triggering are unlikely to be useful. It is typically only via continuous streaming during an emergency that useful audio or video can be captured in practice. There are a restrictive number of emergency contacts. Since the phone itself has to send the emergency messages a maximum of 4 emergency contacts may be defined. There is a risk of insufficient credit. Since the phone itself sends messages using the cellular network via SMS/MMS, the messages will fail to be delivered if the user has insufficient credit. There is no confirmation that the contacts have viewed the messages. Therefore the user has no reassurance that their request for assistance will be responded to. There is no audit trail. Since the messages are not sent to a central server, there will be no record of the user's emergency if the contacts fail to receive the messages. There is no mechanism for inviting contacts or confirming their willingness to fulfill this role. There is no mechanism for communication or information sharing amongst emergency contacts.

Some personal protection systems attempt to address the above drawbacks by providing automatic emergency contact notification based on registered events. An individual has to anticipate potential emergency situations, and register them in advance. The user specifies an event activity such as "taxi ride" or "meeting someone for first time" and the anticipated end time. Upon the event end time being reached, the user is prompted to confirm their safety. If confirmation is not provided by the user, emergency notifications are automatically sent to the user's pre-registered contacts. This approach also suffers from significant drawbacks. First, a user needs to cultivate the habit of pre-registering every potentially dangerous event on their mobile device. This is a major inconvenience which most people are not willing to do. Even for users who cultivate this habit, there is a chance that the very time an emergency actually occurs, the user will have either forgotten to pre-register the event, or simply not have bothered to do so, thus rendering the user unprotected. Second, a user must additionally remember to check-in at the end of the event. Since a user who has managed to cultivate the habit of pre-registering potentially dangerous events may typically do so several times per day, it is likely that sometimes they will forget to check-in, or not notice their mobile device when it prompts them to do so. A false alarm will be triggered, causing the emergency contacts to worry needlessly. If false alarms occur more than very rarely, emergency contacts will tend not to take an emergency alert seriously. This is the "boy who cried wolf" syndrome. Most people for example no longer notice car alarms, because experience shows that they are usually false alarms. Third, when messages are sent via SMS as the delivery channel, the service will be relatively expensive to operate since the phone carriers charge a fee per message, and the service provider must pass this cost on to the consumer. Some systems propose notifying the user's social network. It is hard to imagine why it would make sense to notify such a normally large group of people of an emergency event, it is unlikely that a user would want to broadcast their call for help so widely. Fourth, emergency messages may not be given the necessary priority by a recipient (for example if they are in a meeting). Furthermore, there is no active acknowledgement when a message is received, so the user dealing with the emergency is not aware whether their call for help has been heard. Fifth, there is no mechanism for communication or information sharing amongst emergency contacts. Consequently, personal safety services based around smartphone apps have not achieved widespread use.

Personal Emergency Response Systems (PERS) are also known as medical alarms, these systems are designed to signal the presence of a hazard requiring urgent attention and to summon emergency medical personnel. Often used by elderly or infirm people living on their own, typical systems have a wireless pendant or wristband that can be activated in an emergency. Medical staff are then dispatched to the site where the alarm was activated from. A major disadvantage of these systems is that they typically work at the site where the system is installed. A user who is able to leave their home will therefore be unprotected. Second, these devices are not designed for the general population, and their benefits are therefore not widely available. Third, they are designed for medical emergencies only; other types of emergency such as fire, burglary or personal attack are not catered for.

Since most people wear a wristwatch, and usually do so all the time, some watch manufacturers have recognized its suitability as a personal safety device. Via a built-in miniature transmitter, some watches can be used to broadcast a distress signal on the 121.5 MHz analog band (international emergency frequency) allowing ships, planes, satellites or other vehicles to track it. These watches are not however intended as a substitute for an emergency phone call, they were developed for adventurers who may need to call for help in remote areas where phone service is not available. Furthermore, the price tag is far beyond what most people are willing to spend for a wristwatch.

Some wristwatches are also emergency devices, with integrated mobile phone functionality and location positioning features. The wearer subscribes to the associated personal safety service, and defines emergency contact phone numbers. By pushing the watch's emergency button, the individual's pre-defined emergency contacts are called in sequence until someone answers, and the wearer can talk to them directly through the built-in loudspeaker and microphone. The watch also sends an SMS to the receiver of the emergency call, with a link allowing the location of the wearer to be tracked on a map.

The chief drawbacks of this product are first: most people are not willing to invest in a dedicated emergency watch, which is not capable of other functions. The watch is intended for specific niches, such as the elderly or those with health problems, who are willing to buy a dedicated emergency watch. Second, it is physically too bulky for many, since it must accommodate a mobile phone and GPS technology. At 14*mm* thick, it is bulkier than a typical wristwatch. Third, an expensive subscription is required. The safety service is provided only by the watch manufacturer and includes a mobile phone subscription for the watch itself. Since the watch is not designed for normal phone calls (emergency use only), most people will additionally have to pay for a mobile phone with its own subscription. Fourth, in a noisy environment it will be impossible to have an intelligible conversation using the watch's built-in speaker and microphone. Fifth, in certain types of emergency (e.g. kidnapping) discretion is preferable. This safety service would not be suitable in these situations as a phone call is placed which could be easily heard by those near to the wearer. Sixth, it is not globally usable. Such services can only be used in those countries where they are offered (currently only in Europe). Seventh, there is no mechanism for calling the official emergency services. Eighth, there is no mechanism for inviting contacts or confirming their willingness to fulfill this role (the user simply enters their phone number on a web form). Ninth, there is no ability to share information amongst emergency contacts. In fact only the emergency contact with whom the user speaks is aware of the emergency. An electronic watch for children is available, allowing parents to track their child's location using a mobile app. In the event of an emergency, the child can press an emergency button on the watch, which will call pre-registered emergency contacts sequentially until one of them connects for a voice call. While this offers many benefits for children and their parents, the watch is not designed for adults or even teenagers, and suffers from most of the same disadvantages.

Figure 10:
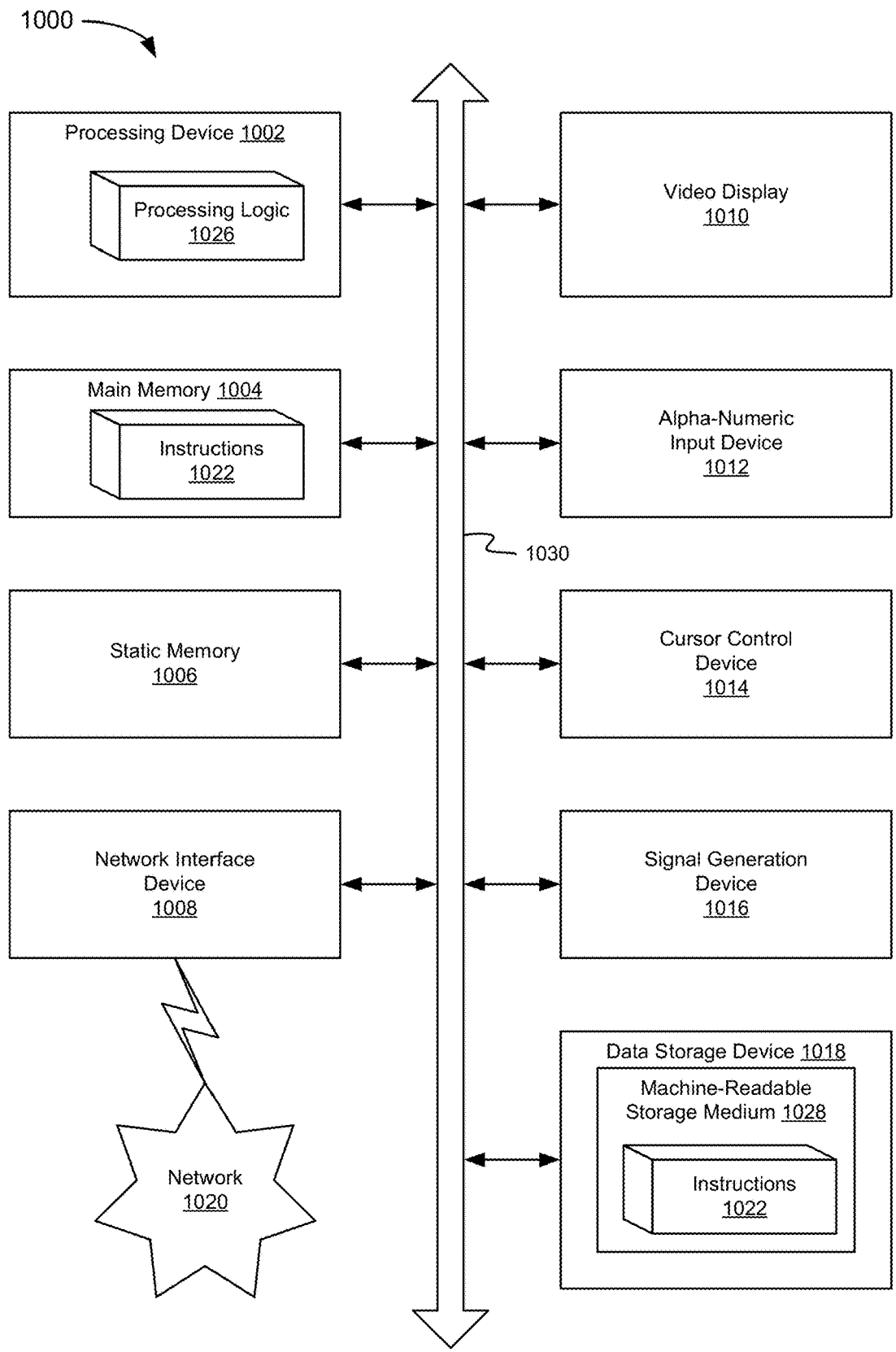
FIG. 10 is a block diagram illustrating an exemplary computer system, according to an embodiment.

FIG. 10 illustrates a diagrammatic representation of a machine in the exemplary form of a computer system 1000 within which a set of instructions, for causing the machine to perform any one or more of the methodologies discussed herein, may be executed. The system 1000 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 1000 may wearable mobile device 102, mobile device 104 or wearable mobile device 122, as shown in FIG. 1.

The exemplary computer system 1000 includes a processing device (processor) 1002, a main memory 1004 (e.g., read-only memory (ROM), flash memory, dynamic random access memory (DRAM) such as synchronous DRAM (SDRAM)), a static memory 1006 (e.g., flash memory, static random access memory (SRAM)), and a data storage device 1018, which communicate with each other via a bus 1030.

Processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also be one or more special-purpose processing devices such as an application specific integrated circuit (ASIC), a field programmable gate array (FPGA), a digital signal processor (DSP), network processor, or the like. The processing device 1002 is configured to execute the notification manager 210 for performing the operations and steps discussed herein.

The computer system 1000 may further include a network interface device 1008. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1016 (e.g., a speaker).

The data storage device 1018 may include a computer-readable medium 1028 on which is stored one or more sets of instructions 1022 (e.g., the instructions of personal safety service client and server applications) embodying any one or more of the methodologies or functions described herein. The instructions 1022 may also reside, completely or at least partially, within the main memory 1004 and/or within processing logic 1026 of the processing device 1002 during execution thereof by the computer system 1000, the main memory 1004 and the processing device 1002 also constituting computer-readable media. The instructions may further be transmitted or received over a network 1020 via the network interface device 1008.

While the computer-readable storage medium 1028 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   detecting activation of a periodic safety confirmation mode, wherein the activation is detected from a first user input received by a smartwatch;
   receiving, from a personal safety service server, a request for safety confirmation;
   detecting a safety confirmation event, wherein the safety confirmation event is detected from a second user input received by a smartwatch;
   providing an indication of the safety confirmation event to the personal safety service server, wherein the personal safety service server is configured to send a notification message via a push notification displayed on user devices of a predefined group of emergency contacts indicating the occurrence of an emergency if the indication of the safety confirmation event is not received within a first pre-defined time interval; and
   periodically receiving additional requests for safety confirmation, wherein each additional request for safety confirmation is received after a second pre-defined time interval has passed.

2. The method of claim 1, wherein the smartwatch is connected to a mobile device via a personal area wireless data network, the mobile device having wide area network connectivity and location services.

3. The method of claim 1, wherein the smartwatch comprises wide area network connectivity and location services.

4. The method of claim 1, wherein the second user input received by the smartwatch comprises at least one of (a) pressing one or more physical buttons on wearable mobile device, (b) turning or pressing a crown of the wearable mobile device, (c) shaking the wearable mobile device to activate an accelerometer, (d) making a selection on a touchscreen of the wearable mobile device, or (e) speaking a predetermined phrase.

5. The method of claim 1, further comprising:
   providing a confirmation that the safety confirmation event was detected and that the indication of the safety confirmation event was provided to the personal safety service server.

6. The method of claim 5, wherein the confirmation comprises a vibration of the smartwatch.

7. The method of claim 1, further comprising:
   receiving user input comprising information about at least one of an environment and potential risks, the user input comprising a selection from a user interface displayed on the smartwatch; and
   providing the information to the personal safety service server.

8. The method of claim 1, further comprising:
   in response to detecting the activation of the periodic safety confirmation mode, capturing audio via a microphone on the smartwatch; and
   streaming the captured audio to the personal safety service server, wherein the personal safety service server is configured to make the capture audio available to the predefined group of emergency contacts.

9. The method of claim 1, further comprising:
   in response to the occurrence of the emergency, initiating a telephone call to official emergency services, wherein the telephone call is transmitted via a data network and audio of the telephone call is transmitted by a microphone and a speaker of the smartwatch.

10. The method of claim 1, further comprising:
    detecting a cancelation event indicating cancelation of the periodic safety confirmation mode, wherein the cancelation event is detected from user input received by the smartwatch; and
    providing an indication of the cancelation of the periodic safety confirmation mode to the personal safety service server.

11. A wearable mobile device comprising:
    a memory storing a personal safety service client application; and
    a processing device coupled to the memory, the processing device to execute the personal safety service client application from the memory to:
       detect activation of a periodic safety confirmation mode, wherein the activation is detected from a first user input received by the wearable mobile device;
       receive, from a personal safety service server, a request for safety confirmation;
       detect a safety confirmation event, wherein the safety confirmation event is detected from a second user input received by the wearable mobile device;
       provide an indication of the safety confirmation event to the personal safety service server, wherein the personal safety service server is configured to send a notification message via a push notification displayed on user devices of a predefined group of emergency contacts indicating the occurrence of an emergency if the indication of the safety confirmation event is not received within a first pre-defined time interval; and
       periodically receive additional requests for safety confirmation, wherein each additional request for safety confirmation is received after a second pre-defined time interval has passed.

12. The wearable mobile device of claim 11, wherein the wearable mobile device is connected to a mobile device via a personal area wireless data network, the mobile device having wide area network connectivity and location services.

13. The wearable mobile device of claim 11, wherein the wearable mobile device comprises wide area network connectivity and location services.

14. The wearable mobile device of claim 11, wherein the second user input received by the wearable mobile device comprises at least one of (a) pressing one or more physical buttons on the wearable mobile device, (b) turning or pressing a crown of the wearable mobile device, (c) shaking the wearable mobile device to activate an accelerometer, (d) making a selection on a touchscreen of the wearable mobile device, or (e) speaking a predetermined phrase.

15. The wearable mobile device of claim 11, wherein the processing device further to:
    provide a confirmation that the safety confirmation event was detected and that the indication of the safety confirmation event was provided to the personal safety service server.

16. The wearable mobile device of claim 15, wherein the confirmation comprises a vibration of the wearable mobile device.

17. The wearable mobile device of claim 11, wherein the processing device further to:
receive user input comprising information about at least one of an environment and potential risks, the user input comprising a selection from a user interface displayed on the wearable mobile device; and
provide the information to the personal safety service server.

18. The wearable mobile device of claim 11, wherein the processing device further to:
in response to detecting the activation of the periodic safety confirmation mode, capture audio via a microphone on the wearable mobile device; and
stream the captured audio to the personal safety service server, wherein the personal safety service server is configured to make the capture audio available to the predefined group of emergency contacts.

19. The wearable mobile device of claim 11, wherein the processing device further to:
in response to the occurrence of the emergency, initiate a telephone call to official emergency services, wherein the telephone call is transmitted via a data network and audio of the telephone call is transmitted by a microphone and a speaker of the wearable mobile device.

20. The wearable mobile device of claim 11, wherein the processing device further to:
detect a cancelation event indicating cancelation of the periodic safety confirmation mode, wherein the cancelation event is detected from user input received by the wearable mobile device; and
provide an indication of the cancelation of the periodic safety confirmation mode to the personal safety service server.

21. A non-transitory computer-readable storage medium storing instructions which, when executed by a processing device, cause the processing device to perform operations comprising:
detecting activation of a periodic safety confirmation mode, wherein the activation is detected from a first user input received by a smartwatch;
receiving, from a personal safety service server, a request for safety confirmation;
detecting a safety confirmation event, wherein the safety confirmation event is detected from a second user input received by a smartwatch;
providing an indication of the safety confirmation event to the personal safety service server, wherein the personal safety service server is configured to send a notification message via a push notification displayed on user devices of a predefined group of emergency contacts indicating the occurrence of an emergency if the indication of the safety confirmation event is not received within a first pre-defined time interval; and
periodically receiving additional requests for safety confirmation, wherein each additional request for safety confirmation is received after a second pre-defined time interval has passed.

22. The non-transitory computer-readable storage medium of claim 21, wherein the smartwatch is connected to a mobile device via a personal area wireless data network, the mobile device having wide area network connectivity and location services.

23. The non-transitory computer-readable storage medium of claim 21, wherein the smartwatch comprises wide area network connectivity and location services.

24. The non-transitory computer-readable storage medium of claim 21, wherein the second user input received by the smartwatch comprises at least one of (a) pressing one or more physical buttons on wearable mobile device, (b) turning or pressing a crown of the wearable mobile device, (c) shaking the wearable mobile device to activate an accelerometer, (d) making a selection on a touchscreen of the wearable mobile device, or (e) speaking a predetermined phrase.

25. The non-transitory computer-readable storage medium of claim 21, wherein the operations further comprise:
providing a confirmation that the safety confirmation event was detected and that the indication of the safety confirmation event was provided to the personal safety service server.

26. The non-transitory computer-readable storage medium of claim 25, wherein the confirmation comprises a vibration of the smartwatch.

27. The non-transitory computer-readable storage medium of claim 21, wherein the operations further comprise:
receiving user input comprising information about at least one of an environment and potential risks, the user input comprising a selection from a user interface displayed on the smartwatch; and
providing the information to the personal safety service server.

28. The non-transitory computer-readable storage medium of claim 21, wherein the operations further comprise:
in response to detecting the activation of the periodic safety confirmation mode, capturing audio via a microphone on the smartwatch; and
streaming the captured audio to the personal safety service server, wherein the personal safety service server is configured to make the capture audio available to the predefined group of emergency contacts.

29. The non-transitory computer-readable storage medium of claim 21, wherein the operations further comprise:
in response to the occurrence of the emergency, initiating a telephone call to official emergency services, wherein the telephone call is transmitted via a data network and audio of the telephone call is transmitted by a microphone and a speaker of the smartwatch.

30. The non-transitory computer-readable storage medium of claim 21, wherein the operations further comprise:
detecting a cancelation event indicating cancelation of the periodic safety confirmation mode, wherein the cancelation event is detected from user input received by the smartwatch; and
providing an indication of the cancelation of the periodic safety confirmation mode to the personal safety service server.

* * * * *